C. A. DEAN.
AUTOMOBILE AXLE CONSTRUCTION.
APPLICATION FILED DEC. 4, 1916.
1,341,265.
Patented May 25, 1920.
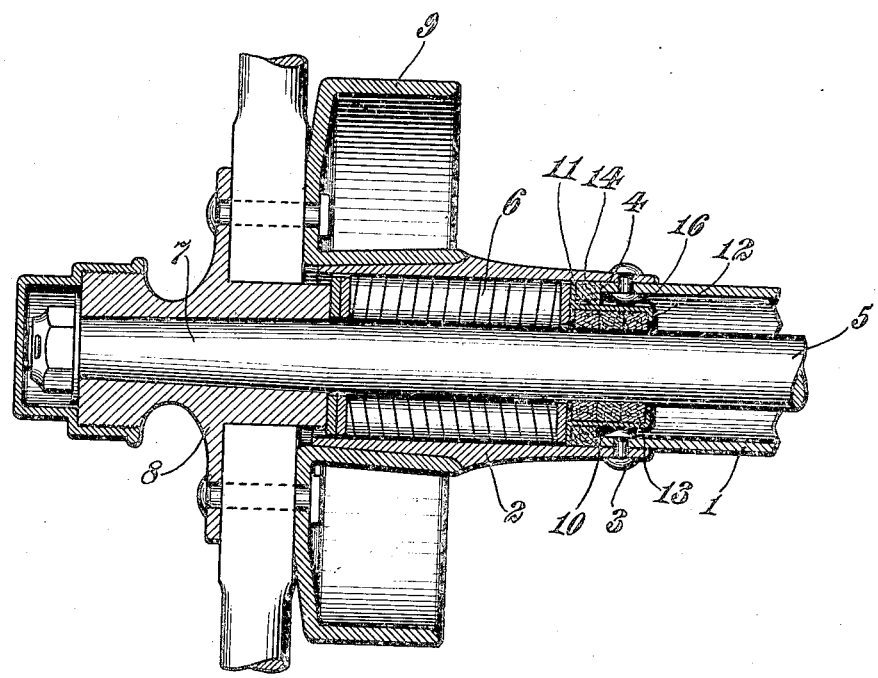
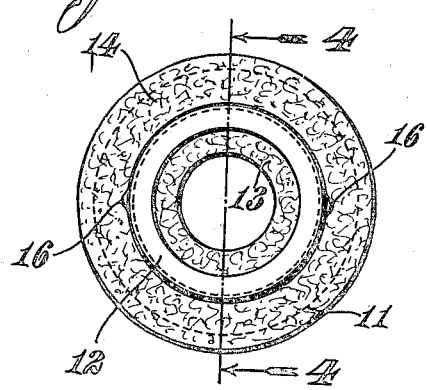
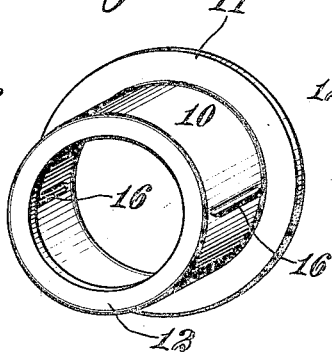
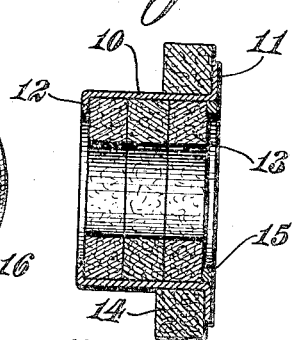
Inventor:
CLARK A. DEAN,
By John H. Bruninga.
His Attorney.

UNITED STATES PATENT OFFICE.

CLARK A. DEAN, OF ST. LOUIS, MISSOURI, ASSIGNOR, BY MESNE ASSIGNMENTS, TO SHURNUFF MANUFACTURING COMPANY, OF ST. LOUIS, MISSOURI, A CORPORATION OF MISSOURI.

AUTOMOBILE-AXLE CONSTRUCTION.

1,341,265.   Specification of Letters Patent.   Patented May 25, 1920.

Original application filed November 13, 1915, Serial No. 61,276. Patent No. 1,224,449, dated May 1, 1917. Divided and this application filed December 4, 1916. Serial No. 134,957.

*To all whom it may concern:*

Be it known that I, CLARK A. DEAN, a citizen of the United States, and residing at St. Louis, in the State of Missouri, have invented a certain new and useful Improvement in Automobile-Axle Construction, of which the following is a specification.

This invention relates to automobiles and more particularly to rear axle constructions therefor. This application is a division of my application Serial No. 61,276, filed November 13, 1915, which matured into Patent No. 1,224,449, granted May 1, 1917.

One of the objects of this invention is to employ between the axle and the housing or casing, a packing device, and to provide means for retaining said packing device against rotation.

Further objects will appear from the detail description taken in connection with the accompanying drawing, in which—

Figure 1 is a vertical longitudinal section through the end of an axle housing or casing and wheel hub, showing the packing embodying this invention;

Fig. 2 is an end view of the packing means;

Fig. 3 is a perspective view of the frame; and,

Fig. 4 is a section on the line 4—4, Fig. 2.

Referring to the accompanying drawing, 1 designates the end of an axle tube or housing which has secured to the end thereof a bearing 2, which in practice is pressed on the axle tube and secured by means of rivets 3, so as to form an interior shoulder 4. This bearing 2 thus forms an extension of the axle tube. The axle tube receives the axle section 5, which is supported in the end of the axle tube by means of a roller bearing 6, and the end 7 of which receives, and is connected with, the hub 8 of the wheel. The wheel has secured thereto the brake drum 9.

Between the axle tube and the axle therein is a stuffing box shown in detail in Figs. 2, 3 and 4. This stuffing box comprises a frame 10, preferably formed of sheet metal and having an outturned flange 11 and an inturned flange 12. Carried inside of the frame is a series of felt packing rings 13, while carried by the outside of the frame is a felt packing ring 14. A metallic bearing ring 15 is adapted to be positioned against the outermost packing ring 13, and inside of the frame, while the frame is provided with a series of longitudinal ribs 16, preferably pressed therein.

The device as thus constructed, therefore, provides a unitary structure arranged to be positioned between the axle and the axle tube with the outer ring 14 bearing against shoulder 4 and the flange 11 bearing against the roller bearing cage 6. The frame is of such diameter as to pass inside of the heads of the rivets 3, and the ribs 16 engaging these rivet heads will prevent the frame from turning. There is thus provided a device which will closely seal the axle with respect to the axle tube, so as to prevent oil from passing out of the end thereof.

It is obvious that various changes may be made in the details of construction without departing from the spirit of this invention. It is, therefore, to be understood that this invention is not to be limited to the specific construction shown and described.

Having thus described the invention, what is claimed is:

1. In an automobile axle construction having an axle inclosing housing, a stuffing box mounted in the housing, lubricant retaining packing in said stuffing box, means for retaining said stuffing box in the housing and coöperating means on said stuffing box and housing for preventing rotation of the stuffing box in the housing.

2. In an automobile, an axle casing, an axle therein, and a lubricant retaining packing device positioned between the axle and the casing, said packing device comprising felted packing, a frame therefor adapted to maintain said packing in sealing engagement with both the axle and the casing, and coöperating means on said frame and said casing for preventing rotation of said frame in said casing.

3. In an automobile axle casing, a lubricant-retaining packing device adapted to be positioned between the axle and the casing and comprising, a frame, a felted packing ring in said frame adapted to engage the axle, a felted packing ring on said frame adapted to engage the casing, and a retaining element on said frame, adapted for coöperation with the casing, for preventing rotation of said frame in said casing.

In testimony whereof I affix my signature this 24th day of November, 1916.

CLARK A. DEAN.